(No Model.)  2 Sheets—Sheet 1.
J. S. HAZARD.
REGULATOR FOR GASES OR FLUIDS UNDER PRESSURE.
No. 314,020. Patented Mar. 17, 1885.
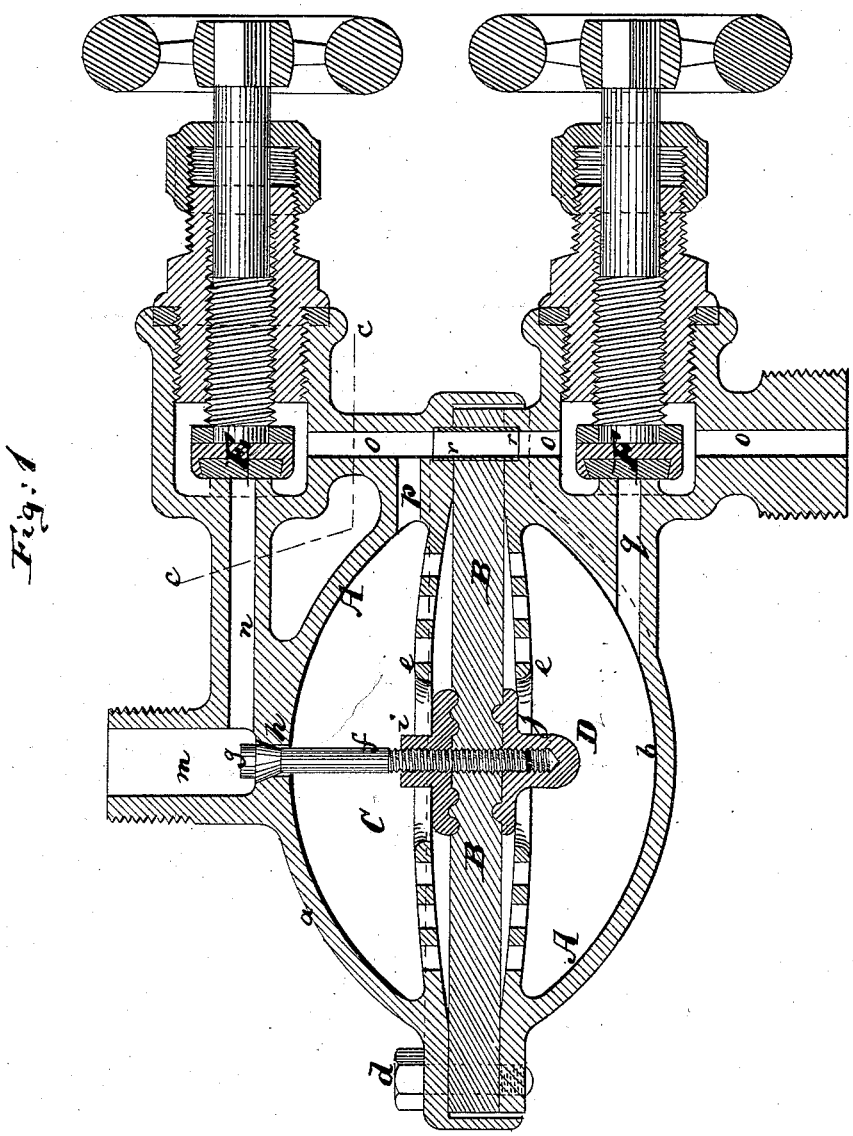
Witnesses
John C. Tunbridge.
John M. Speer.
Inventor
James S. Hazard
by his attorneys
Briesen & Steele (No Model.) 2 Sheets—Sheet 2.
J. S. HAZARD.
REGULATOR FOR GASES OR FLUIDS UNDER PRESSURE.
No. 314,020. Patented Mar. 17, 1885.
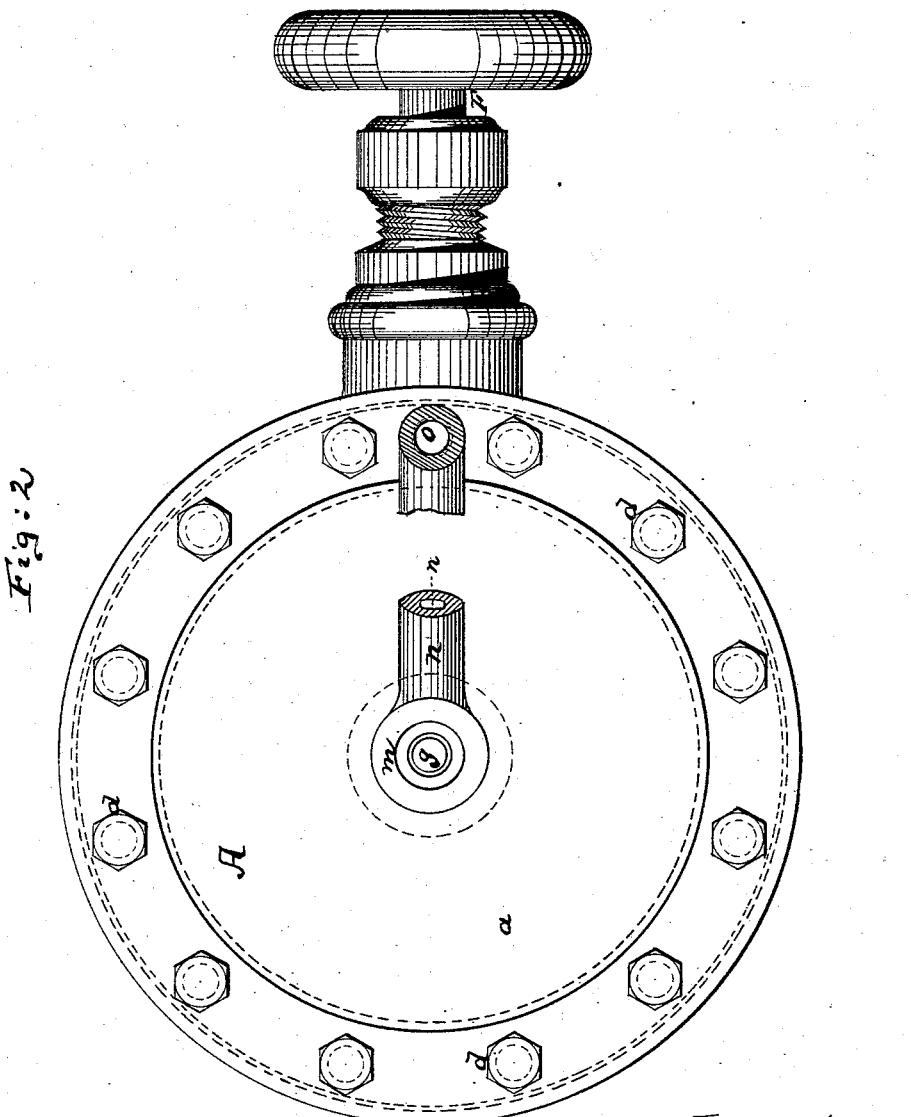
Witnesses
John C. Tunbridge
John M. Speer
Inventor:
James S. Hazard
by his attorneys
Briesen & Steele

UNITED STATES PATENT OFFICE.

JAMES S. HAZARD, OF NEWPORT, RHODE ISLAND, ASSIGNOR TO THE FIRM OF JOHN MATTHEWS, OF NEW YORK, N. Y.

REGULATOR FOR GASES OR FLUIDS UNDER PRESSURE.

SPECIFICATION forming part of Letters Patent No. 314,020, dated March 17, 1885.

Application filed May 15, 1884. (No model.)

*To all whom it may concern:*

Be it known that I, JAMES S. HAZARD, a resident of Newport, in the county of Newport and State of Rhode Island, have invented an Improved Regulator for Gases or Fluids under Pressure, of which the following is a full, clear, and exact description, reference being made to the accompanying drawings, in which—

Figure 1 is a vertical central section of my improved regulator. Fig. 2 is a plan or top view, partly in section, of the same, the line *c c*, Fig. 1, indicating the plane of section.

This invention relates to an automatic regulator for gases or fluids under pressure which are to be filled into receivers. It is applicable, among others, to fountains or other vessels containing gas or water under pressure, its object being to maintain the pressure in the vessel at a certain predetermined point, whether said vessel is to be filled or emptied. One special object to which the invention can be applied, although not the only object, will be to regulate the pressure in soda-water fountains that are being emptied into bottles or siphons, so that, no matter how much water is from time to time withdrawn from such a fountain, the pressure within it will, nevertheless, by means of my regulator, be maintained at the predetermined point. To this end the regulator is interposd between the fountain which is to be emptied and a vessel containing gas under greater pressure than that which is to be maintained in said fountain.

The invention consists, principally, in placing within the main chamber of the regulator a movable diaphragm, by which said chamber is divided into two chambers, one of which, when the device is in operation, is always in communication with the vessel to be emptied, while the other contains the gas under pressure at the degree at which it is to be maintained in the vessel to be emptied. When the pressure becomes reduced in said last-mentioned vessel, the diaphragm is moved to open a valve and establish communication between the two vessels until the pressure is again at the proper degree in the vessel to be filled.

In the accompanying drawings, the letter A represents the body of the regulator, the same being a hollow box with bulging heads *a* and *b*, although it may also be made of other form. The center of this hollow box A is traversed by a diaphragm, B, of india-rubber or other suitable elastic material, which diaphragm is clamped between the overlapping halves of the box, as in Fig. 1, or held in place by other means. These overlapping halves, when employed in the form shown, are united by suitable bolts, *d d*. The diaphragm B divides the box or body of the regulator into two chambers, which are marked C and D, respectively. In each of these chambers is a perforated disk or plate of metal, *e*, which is at a short distance from the diaphragm B when the same is in the central or normal position shown in Fig. 1. These perforated disks *e e* serve to limit the movement of the flexible diaphragm, preventing it from moving too far beyond its normal position. In order to permit this, these disks *e* have large central apertures, through which the nuts *i* and *j* on the diaphragm may protrude.

The diaphragm B has attached to it the stem *f* of a valve, *g*, which valve is seated in an aperture, *h*, that is formed in the walls of the chamber C. One manner of fastening the stem *f* to the diaphragm B is indicated in Fig. 1, and consists of two nuts, *i* and *j*, which are placed against opposite sides of the diaphragm B, and both threaded to receive the threaded part of the screw *f*. The lower nut, *j*, which faces the chamber D, has its central portion made cup-shaped, so that no gas can leak from the chamber into the space which may intervene between said nut and the screw-stem *f*. The faces of the nuts *i* and *j* which are contiguous to the diaphragm B are ribbed, as shown, so that the ribs may embed themselves in the rubber of the diaphragm and prevent leakage of gas along the inner part of the diaphragm. The nuts *i* and *j* permit the stem *f* to be turned so that the distance between the diaphragm and the valve *g* may be increased or reduced at pleasure, allowing the diaphragm to be set for its normal position, either centrally, as in Fig. 1, or higher or lower than shown in said figure. In other words, by thus rendering the valve-stem $f$ lengthwise adjustable, I am in position to regulate the size of the chambers C and D for the normal position of the parts.

The chamber C, when the aperture $h$ is opened by raising the valve $g$, communicates with the inlet-passage $m$ of the regulator—that is to say, with a passage which connects by a suitable tube with the generator or a vessel containing the gas under greatest pressure, or, in other words, with the vessel containing the supply of gas from which the other vessel (the fountain) is to be supplied from time to time by this regulator. The passage $m$ communicates at all times with a passage, $n$, the end of which can be closed by a valve, E. When this valve E is opened, the passage $n$ communicates with a passage, $o$, from which a branch passage, $p$, leads into the chamber C. Another branch passage, $q$, extends from the passage $o$ into the chamber D, but can be closed whenever desired by a valve, F; but this valve F never interferes with the continuity of the passage $o$. It will be perceived from what I have stated that the chamber C of the regulator communicates always with the passage $o$, and that the chamber D of the regulator communicates with the passage $o$ only when the valve F is opened; otherwise not. The free end of the passage $o$ connects by a suitable pipe with the vessel within which the pressure is to be regulated—in the instance I have given with a fountain from which soda-water or mineral water is to be filled, under pressure, into bottles or siphons.

The operation is as follows: The pipe $m$ is connected with a generator or vessel containing gas under considerable pressure—say one hundred pounds. The pipe $o$ is made to communicate with the fountain or vessel within which the pressure is to be maintained at a certain point less than that in the first-mentioned vessel or generator—say sixty pounds. The valve $g$ is closed. The valves E and F are now both opened, thus allowing the gas from the generator to flow through the passages $m\ n\ o$ into the fountain through the passages $m\ n\ o\ p$ into the chamber C, and through the passages $m\ n\ o\ q$ into the chamber D. As soon as the gas thus let into the fountain and into the chambers C D reaches the pressure which it is desired to maintain in the fountain—say sixty pounds—the valves E and F are both closed. It will be perceived that now the chamber D, which is wholly isolated from the other vessels and chambers, contains gas under the predetermined degree of pressure, which in the example has been stated as sixty pounds. As the gas is now being withdrawn from the fountain in the act of filling bottles or siphons, the pressure within said fountain becomes gradually less, and so soon as it becomes less than sixty pounds in the fountain it also becomes less than sixty pounds in the chamber C of the regulator, with which chamber said fountain is always in communication, and so soon as the pressure in the chamber C becomes less than it is in the chamber D the pressure in the chamber D will raise the diaphragm B, open the valve $g$, and establish communication through the opening $h$ between the generator, the chamber C, passage $p$, passage $o$, and fountain; hence the pressure in the fountain is immediately and automatically restored to the proper degree as soon as it falls short of the same. Immediately upon the pressure in the chamber C becoming equal to that in the chamber D, the valve $g$ is again closed, thereby leaving the gas in the fountain isolated from that in the generator, and it will remain so isolated as long as the pressure in the fountain remains at sixty pounds, and as soon as the pressure in the fountain becomes less than sixty pounds the diaphragm is immediately raised and communication re-established between the generator and the fountain, as described.

It will be perceived from what I have stated that the main feature of my invention consists in the use of a regulator which has a flexible diaphragm, forming two chambers, of which one chamber is always filled with gas under the predetermined degree of pressure. A suitable gage on the fountain will show at the beginning of operations how much pressure there is in the chamber D, and that pressure can be made greater or less, as occasion may require, by leaving the valve F, at the beginning of operations, open for a longer or shorter period of time; hence this regulating gas-chamber in the regulator is an important step in advance over all regulators which had their diaphragms loaded with springs or weights, for such devices were incapable of the fine and immediate adjustment to varying degrees of pressure to which my improved regulator can be applied.

In Fig. 1 it will be perceived that the substance of the rubber B extends past the passage $o$, and that, in fact, said passage $o$ goes through this rubber. In order to prevent the rubber, when the two parts of the body A of the regulator are bolted together, from bulging into and more or less closing the passage $o$, I place a rigid tube, $r$, in the perforation of the rubber which is aligned with the passage $o$, and make this tube longer than the rubber is thick, so that its ends will fit the chambered portions of the parts of the body A which have been prepared to receive them, as is clearly shown in Fig. 1 of the drawings.

I claim—

1. The pressure-regulator A, containing flexible diaphragm B, forming two chambers, C D, and passages, substantially as described, in combination with the valve F, by means of which the chamber D can be wholly isolated, after filling, from the remaining chambers and passages and its contents used as a load on the diaphragm, substantially as described.

2. The regulator A, having movable diaphragm B, forming two chambers, C D, in combination with the valve g, passages m n o p q, and valves E F, substantially as described.

3. The combination of the regulator A, having flexible diaphragm B, with the perforated screens e, placed on opposite sides of said diaphragm and adapted to limit its movements, substantially as described.

4. The combination of the regulator A and its diaphragm B with the nut i, having ribbed contact-face, nut j, having ribbed contact-face and cup-shaped central portion, screw-stem f, and valve g, substantially as and for the purpose herein shown and described.

5. The combination of the regulator A, which is constructed of two parts, with the rubber diaphragm B, clamping-bolts d, and with the tube r, which extends through the rubber in line with the passage o, which is formed in the body of the regulator, substantially as described.

JAMES S. HAZARD.

Witnesses:
EDWIN S. BURDICK,
SAM. T. HOPKINS.